Dec. 29, 1942.  A. J. SORENSEN  2,306,507
BRAKE CONTROL MEANS
Filed Sept. 27, 1941  2 Sheets—Sheet 1
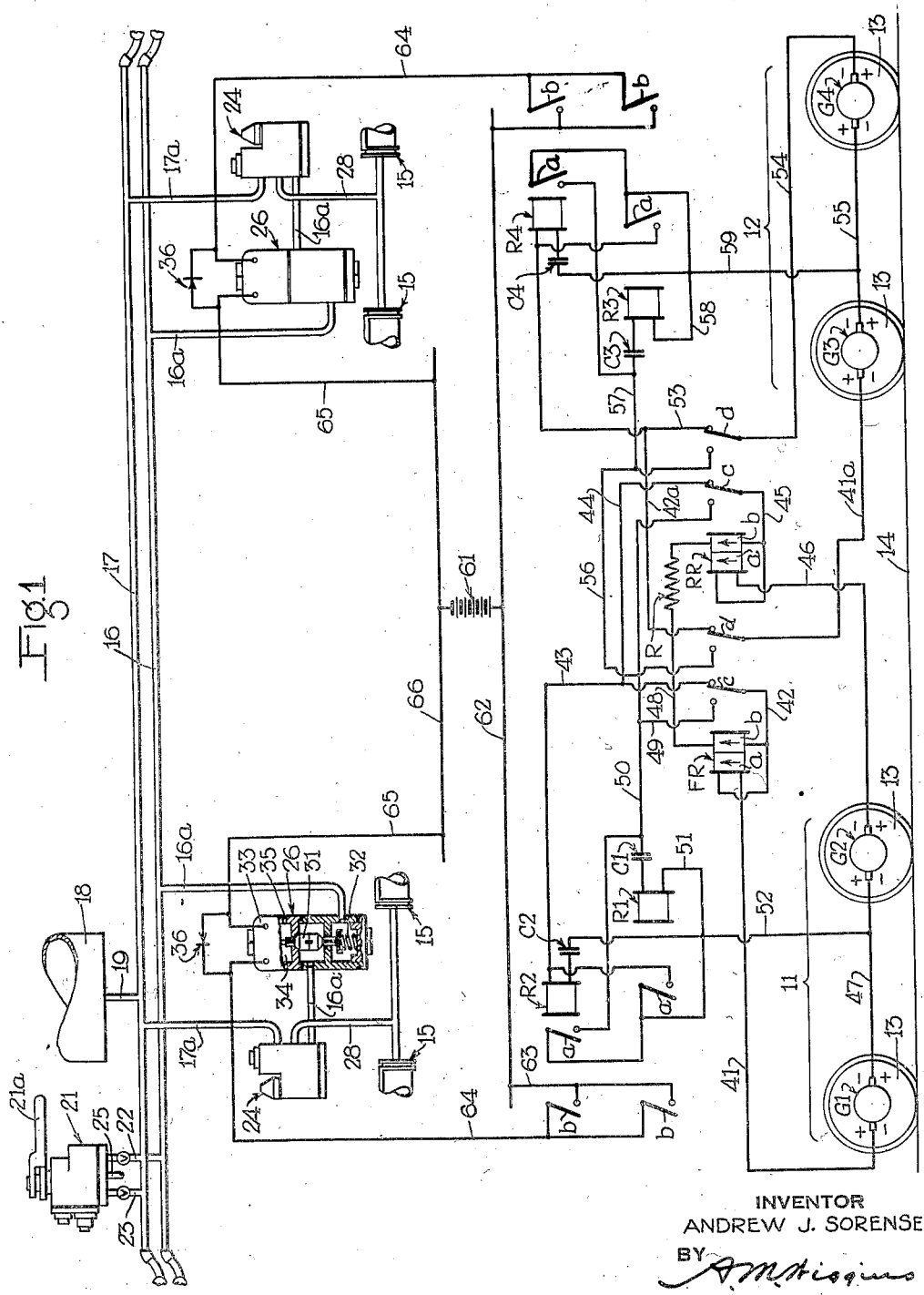
INVENTOR
ANDREW J. SORENSEN
BY
ATTORNEY

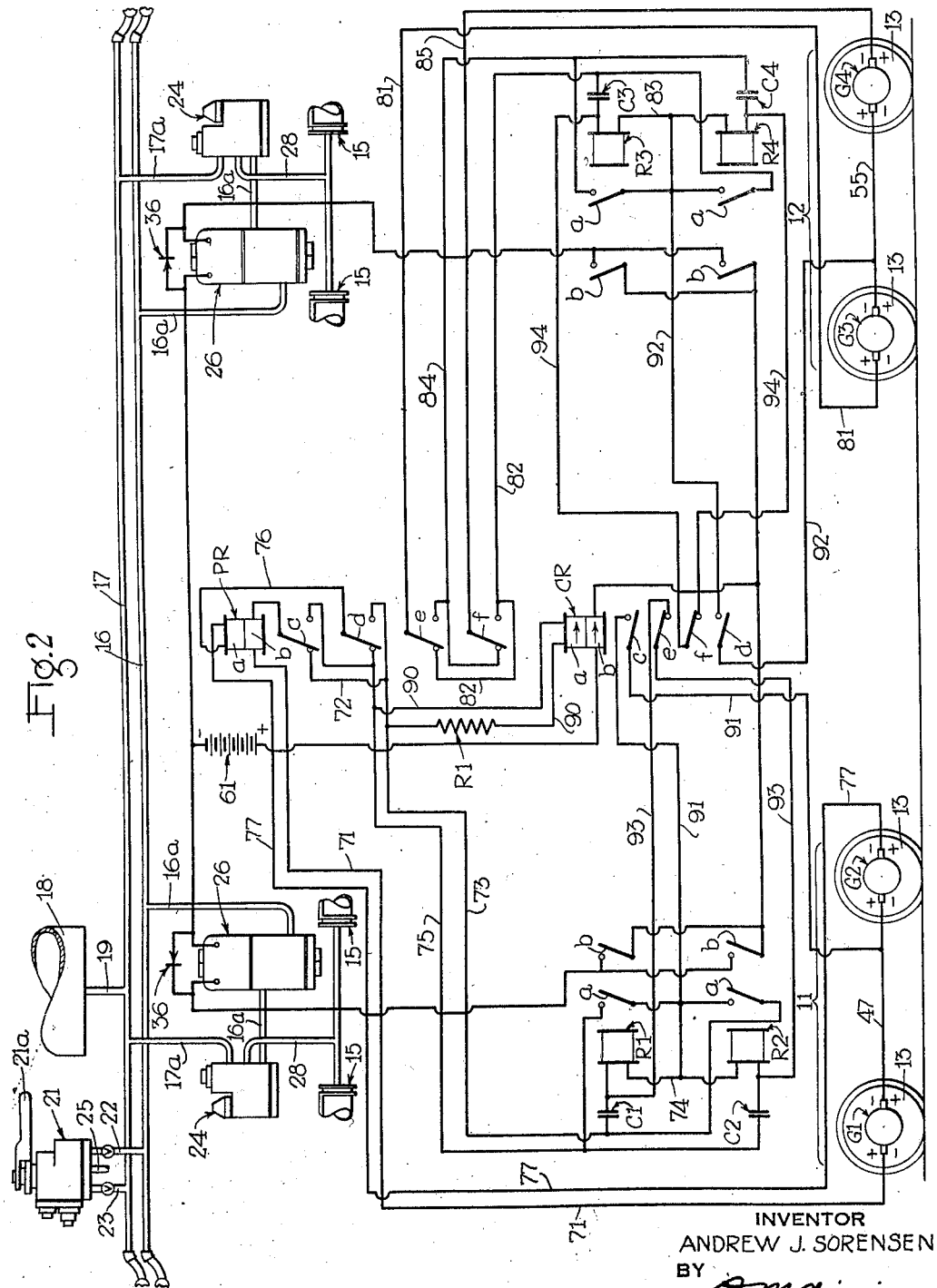

Patented Dec. 29, 1942

2,306,507

UNITED STATES PATENT OFFICE 2,306,507

BRAKE CONTROL MEANS

Andrew J. Sorensen, Edgewood, Pa., assignor to The Westinghouse Air Brake Company, Wilmerding, Pa., a corporation of Pennsylvania Application September 27, 1941, Serial No. 412,545

21 Claims. (Cl. 303—21)

This invention relates to brake control means for vehicles, such as railway cars and trains, and has particular relation to brake control equipment including means for automatically reducing the degree of application of the brakes associated with a vehicle wheel that slips whereby to cause the slipping wheel to return to a speed corresponding to vehicle speed before reducing in speed to a locked condition and sliding.

In the present application, a vehicle wheel is said to slip or to be in a slipping condition when it rotates at a speed less than a speed corresponding to vehicle speed at a given instant. As distinguished from a "slipping" wheel, a "sliding" wheel is one which is being dragged along a road surface or rail in a locked or non-rotative condition.

It will be understood that it is desirable to prevent the sliding of car wheels in order to prevent the development of flat spots on the wheels necessitating repair or replacement of the wheels—which is objectionable.

Various types of devices have been proposed for recognizing the slipping condition of a vehicle wheel and effective to cause a rapid reduction in the degree of application of the brakes associated with the wheel at the instant that it begins to slip in order to cause the wheel to be restored to a speed corresponding to vehicle speed before it can reduce in speed to a locked or non-rotative condition and slide. One example of such brake control equipment is disclosed in Patent 2,208,738 to Claude M. Hines. In this patent, an electrical condenser and the winding of a relay are connected in series relation across the terminals of a direct-current axle-driven generator which supplies voltage substantially proportional to the rotational speed of the wheels fixed to the axle. When the wheels accelerate, the corresponding increase in the voltage delivered by the generator causes a current to be supplied to charge the condenser. When the wheels decelerate, the corresponding reduction in the voltage supplied by the generator causes a current to be discharged from the condenser. The current supplied to charge the condenser and the current discharged from the condenser is substantially proportional in degree to the rate of acceleration and the rate of deceleration, respectively, of the car wheels.

The relay is so designed as to be picked-up and thereby initiate a rapid reduction in the degree of application of the brakes associated with the slipping wheel only in response to a current discharged from the condenser and exceeding a certain value corresponding to a certain rate of deceleration of the vehicle wheels. This certain rate of deceleration of the vehicle wheels is not attained unless the wheel is slipping and therefore the relay is not operated to effect a reduction in the degree of application of the brakes unless the wheel begins to slip.

Associated with the relay is a pressure operated switch responsive to the pressure in the brake cylinders controlling the brakes associated with the vehicle wheel. When the relay is picked-up, it establishes a self-holding circuit including the pressure switch which is closed as long as the pressure in the brake cylinders exceeds a certain low value. Thus, once the reduction in brake cylinder pressure is initiated by pick-up of the relay, it is continued until the pressure switch is operated to open position in response to the reduction of the brake cylinder pressure below the certain low value. The reduction in the brake cylinder pressure is thereupon terminated and the resupply of fluid under pressure to the brake cylinder initiated to effect the reapplication of the brakes.

It is an object of my present invention to provide a vehicle brake control equipment of the type shown in Patent 2,208,738 and characterized by an arrangement not necessitating the reduction of pressure in the brake cylinders to below a certain value in order to initiate reapplication of the brakes following slipping of a wheel.

It is another object to provide a vehicle brake control equipment of the type indicated in the foregoing object and characterized by means effective to cause a reduction of the pressure in the brake cylinders associated with the slipping wheel for a certain predetermined time following the instant the wheel begins to slip.

In a brake control equipment of the character disclosed in Patent 2,208,738 and including a direct-current axle-driven generator, the polarity of the terminals of the generator reverses with a reversal in the direction of rotation of the vehicle wheels. In order to permit operation in a proper manner of the relay responsive to the slipping condition of the wheel, it is necessary to control the connections to the terminals of the generator in accordance with the direction of rotation of the vehicle wheel to attain the proper operation.

In Patent 2,208,738 the direction of rotation of a vehicle wheel is recognized by means of a polarized relay responsive to the polarity of the terminals of an axle-driven generator. If for some reason, the polarized relay fails to operate properly in accordance with the polarity of the terminals of the axle-driven generator, the apparatus responsive to the slipping condition of the vehicle wheel will fail to operate in a proper manner.

It is accordingly another object of my invention to provide apparatus for obviating this difficulty and preventing the improper connection of the apparatus to the axle-driven generator and thereby the improper operation thereof as a result of a reversal in the direction of rotation of the vehicle wheel.

The above objects, and other objects of my invention which will be made apparent hereinafter, are attained by means of apparatus subsequently to be described and shown in the accompanying drawings wherein Fig. 1 is a simplified diagrammatic view, showing a brake control equipment embodying my invention as applied to a single car, and Fig. 2 is a diagrammatic view, showing a modified arrangement also embodying my invention.

*Description of embodiment shown in Fig. 1*

Referring to Fig 1, the brake control equipment is shown as applied to a single car having two four-wheel trucks 11 and 12 respectively at opposite ends of the car. Each truck comprises two wheel-and-axis units or assemblies, each assembly consisting of an axle and two wheels 13 fixed at opposite ends thereof for engaging opposite rails of the track indicated by the line 14. It will be understood that only one wheel 13 of each wheel-and-axle assembly is visible in the drawings.

Any suitable type of brake, such as the conventional clasp shoe type, may be associated with the vehicle wheels and arranged to exert a braking effect on the wheels in response to the pressure of fluid supplied to one or more brake cylinders 15. As shown, one brake cylinder 15 is provided for operating the brakes associated with each wheel-and-axis assembly, such brake cylinder being shown in substantial vertical alignment above the corresponding wheel-and-axle assembly.

Any suitable type of fluid pressure brake control equipment may be provided for controlling the supply of fluid under pressure to and the release of fluid under pressure from the brake cylinders 15 under the control of the operator of the vehicle. For simplicity, I have shown a simplified fluid pressure brake control equipment of the straight-air type. This equipment includes two train pipes 16 and 17 extending longitudinally from end to end of the car and referred to hereinafter respectively as the control pipe 16 and the supply pipe 17; a reservoir 18 constantly connected to the supply pipe 17 through a branch pipe 19; and a brake valve 21 of the self-lapping type, connected through branch pipes 22 and 23 to the control pipe 16 and supply pipe 17 respectively, for controlling the pressure in the control pipe 16. The equipment further includes a relay valve device 24 for each wheel truck, each relay valve device being connected to the control pipe 16 through a branch pipe 16a in which is interposed a magnet valve device 26 and being effective in accordance with the pressure established in the control pipe 16 and supplied thereto through the branch pipe 16a to cause the supply of fluid under pressure from the supply pipe 17 through a branch pipe 17a of the supply pipe to a pipe 28 having two branches leading to the two brake cylinders 15 of the corresponding truck.

Considering the aforementioned parts of the fluid pressure brake control equipment in greater detail, the brake valve 21 is of the type described and claimed in Patent 2,042,112 to Ewing K. Lynn and Rankin J. Bush. Since reference may be had to the patent, the brake valve 21 is shown only in outline form and will be here only functionally described. With the brake valve handle 21a in its normal or brake release position, fluid under pressure is released from the control pipe 16 to atmosphere by way of the branch pipe 22 and an exhaust port and pipe 25 at the brake valve. Upon the rotary displacement of the brake valve handle 21a in a horizontal plane out of its brake release position into a so-called application zone, the brake valve mechanism causes the exhaust communication just described to be closed and establishes a supply communication through which fluid under pressure is supplied from the reservoir 18 and the supply pipe 17 through the branch pipes 23 and 22 to the control pipe 16. The character of the brake valve 21 is such that the pressure established in the control pipe 16 is substantially proportional to the degree of displacement of the brake valve handle 21a out of its brake release position. If the pressure in the control pipe tends to reduce for some reason, such as leakage, the valve mechanism of the brake valve 21 operates automatically to supply fluid under pressure to the control pipe to maintain a pressure therein corresponding to the position of the brake valve handle in the application zone. This pressure-maintaining feature of the brake valve will be referred to hereinafter in connection with an assumed operation.

The relay valve device 24 is of the type described and claimed in Patent 2,096,491 to Ellis E. Hewitt. Since reference may be had to the patent, the relay valve device is shown in outline form only and will be here only briefly described. Essentially the relay valve device 24 comprises a self-lapping valve mechanism including a supply valve, a release valve, and an operating diaphragm or piston therefor. The operating piston has a chamber at one side hereinafter referred to as the control chamber which is connected by the pipe 16a to the control pipe 16. On the opposite side of the operating piston is a chamber, hereinafter called the pressure chamber, which is connected by the pipe 28 to the brake cylinders 15.

Upon the supply of fluid under pressure to the control chamber, the release valve is closed and the supply valve is opened and fluid under pressure is thereby supplied from the branch pipe 17a of the supply pipe 17 to the pressure chamber and thence through the pipe 28 to the brake cylinders 15. When the pressure established in the brake cylinders and consequently in the pressure chamber of the relay valve device 24 substantially equals or is a certain proportion or percentage of the pressure established in the control chamber the supply valve is closed while the release valve remains seated or closed, thereby establishing a pressure in the brake cylinders which corresponds to or is a certain percentage of that established in the control pipe 16.

When the pressure in the control chamber of the relay valve device 24 is reduced, the release valve is opened and fluid under pressure thereby exhausted to atmosphere from the pressure chamber and connected brake cylinders until a substantial balance of the fluid pressures in the pressure chamber and control chamber is again obtained, when the release valve is closed to terminate the further reduction of the pressure in the brake cylinders.

The character of the valve mechanism of the relay valve device 24 is such as to cause corresponding variations of the pressure in the brake cylinders in response to small variations of pressure in the control pipe. At the same time the valve mechanism of the relay valve device 24 is of high capacity so as to cause a variation of the pressure in the brake cylinders at a rapid rate in response to a rapid reduction of the pressure in the control chamber of the relay valve device 24.

The magnet valve device 26 is a standard type of magnet valve and comprises essentially a casing in which is contained a double beat valve 31 that is biased to an upper seated position by a spring 32 and actuated to a lower seated position in response to energization of a magnet winding or solenoid 33. With valve 31 in its upper seated position, communication through the branch pipe 16a from the control pipe 16 to the control chamber of the relay valve device 24 is established past the lower valve seat of the valve 31. With valve 31 in its lower seated position, communication through the pipe 16a is closed and an exhaust communication is established from the section of the pipe 16a connected to the control chamber of the relay valve 24 to a chamber 34 that is constantly connected to atmosphere through a relatively large exhaust port 35. Thus when the magnet winding 33 of the magnet valve 26 is energized, fluid under pressure is exhausted at a rapid rate from the control chamber of the relay valve device 24.

Connected in shunt relation across the terminals of the magnet winding 33 of each magnet valve 26 is asymmetric device or rectifier 36, either of the dry disk or tube type, the purpose of which will be explained hereinafter.

In accordance with my present invention, I further provide apparatus responsive to the slipping of the vehicle wheels on a given truck for the purpose of controlling energization and deenergization of the magnet winding 33 of the magnet valve 26 for that truck. Such apparatus includes an axle-driven generator of the direct-current type for each wheel-and-axle assembly, the generators of the four wheel-and-axle assemblies shown being designated respectively G1, G2, G3 and G4. The generators may be driven in accordance with the rotational speed of a wheel-and-axle assembly through any suitable driving connection. As illustrated, the generators are indicated as mounted in the journal casing at the end of an axle with the armature shaft of the generator disposed in coaxial relation with the axle and coupled thereto.

The polarity of the terminals of the generators reverses upon a reversal in the direction of rotation of the wheels and axle for reasons well known.

It is here assumed that if the vehicle is traveling in a forward direction, the left-hand terminal of each generator is of positive polarity and the right-hand terminal of negative polarity. Conversely it is assumed that for reverse rotation of the vehicle wheels or reverse travel of the car the left-hand terminal of each generator is of negative polarity and the right-hand terminal is of positive polarity. This reversal of polarity of the generator terminals is indicated by the plus and minus signs above and below the terminals.

The apparatus further includes four relays R1, R2, R3 and R4; four electrical condensers C1, C2, C3 and C4; a resistor R; and two directional relays FR and RR.

The relays R1 to R4 are of the uni-directional type, each having a single winding and two front contacts $a$ and $b$. The contacts $a$ and $b$ remain in their dropped-out or open positions unless the winding is energized by a current exceeding a certain value and flowing in one certain direction therethrough. If the current is insufficient or if it is in the opposite direction to the said one certain direction, the contacts are not actuated to the picked-up position thereof.

The condensers C1 and C4 are of the electrolytic type in order to attain a maximum condenser capacity with a minimum space requirement. As is well known, condensers of this type are designed for the flow of charging current thereto in one direction only and if they should be subjected to flow of current in the opposite direction, they will be rapidly destroyed. In view of this asymmetric or unidirectional characteristic of electrolytic condensers, they are properly operated only in a manner such that a uniform polarity of voltage is impressed thereon so that the flow of current to charge the condensers is always in the proper direction.

In view of the reversal of polarity of the generators G1 to G4 with the reversal of direction of rotation of the vehicle wheels, it is accordingly necessary to provide directional control apparatus including the directional relays FR and RR so that a uniform polarity of generator voltage is impressed on the condensers and relays.

The directional relays FR and RR are of the unidirectional type, each having two separate windings $a$ and $b$ and two transfer contacts $c$ and $d$. The relays FR and RR are of such nature that the transfer contacts $c$ and $d$ are not actuated from their dropped-out position to their picked-up position unless either or both of the windings are energized by current in excess of a certain value and flowing in one certain direction, indicated by the arrows.

The windings of the directional relays FR and RR are adapted to be connected in series relation in a circuit including the combined voltages of the two generators G1 and G2 in the manner more specifically described hereinafter. It is here assumed that when the vehicle is traveling in a forward direction, the direction of flow of current through the winding of the relay FR is in the proper direction to cause actuation of the contacts of this relay to the picked-up position whereas the direction of flow of current through the windings of the relay RR is simultaneously in a direction opposite to that required to cause pick-up of the contacts. Conversely, when the vehicle travels in a reverse direction, the direction of flow of current through the winding of the relay FR is opposite to that required to cause pick-up of the contacts thereof and in the proper direction through the winding of the relay RR to cause pick-up of the contacts thereof. The circuit connections whereby energization of the windings of the relays FR and RR is effected will be more specifically described hereinafter.

The transfer contacts $c$ and $d$ of directional relays FR and RR are so arranged as to control the connection of each one of the relays R1, R2, R3 and R4 and an associated one of the condensers C1, C2, C3 and C4 in series relation across the terminals of one of the corresponding generators G1, G2, G3 and G4 in the manner more specifically described hereinafter so that

Operation of equipment

Let it be assumed that the car having the equipment shown in Fig. 1 is at a standstill with the brake valve handle 21a in brake release position so that the brakes are released and that the operator desires to start the car in a forward direction. To do so the operator operates a suitable propulsion controller, not shown, to cause the supply of power to the propulsion motors of the car or, in the case of a steam locomotive, the supply of steam to the cylinders of the locomotive.

When the car exceeds a certain low speed, such as ten miles per hour, the combined voltage of the two generators G1 and G2 is effective to cause energization of the winding a of the directional relay FR in the proper direction to cause pick-up of its transfer contacts c and d. The circuit for energizing the winding a of the relay FR may be traced from the left-hand terminal of generator G1 by way of a wire 41, winding a of the relay FR in the proper direction to cause pick-up of the contacts c and d of the relay, a wire 42, contact c of relay FR in its dropped-out position, a wire 43, a branch wire 44, contact c of the relay RR in its dropped-out position, a wire 45, winding a of the relay RR in a direction opposite to that necessary to cause pick-up of the contacts c and d thereof, a wire 46 to the right-hand terminal of the generator G2, through the armature winding of the generator G2 to the left-hand terminal thereof, a wire 47 connecting the left-hand terminal of the generator G2 and the right-hand terminal of the generator G1, and through the armature winding of the generator G1 to the left-hand terminal of the generator G1.

When the contact c of the relay FR is actuated to its picked-up position, it removes the shunt connection established thereby around the series related windings b of the two relays FR and RR and resistor R, thereby causing the windings b of the relays and resistor R to be included in series relation in the circuit just traced. It will be apparent that with the contact c of relay FR in its picked-up position, the circuit may be traced from the wire 41 through the winding a of the relay FR, wire 42, winding b of the relay FR, a wire 48 including the resistor R, winding b of the relay RR, wire 45, and winding a of the relay RR to the wire 46.

It will thus be seen that due to the additional amperes turns of the winding b of relay FR assisting the winding a of this relay, the contacts are positively maintained in the picked-up positions thereof once they attain such positions.

In its picked-up position, the contact c of the relay FR is effective to cause the condenser C1 and the winding of the relay R1 to be connected in series relation with the winding a of the relay FR across the terminals of the generator G1. At the same time the contact c of the relay RR is effective in its dropped-out position to establish a circuit including the winding a of the relay RR, the winding of the relay R2, and the condenser C2 across the terminals of the generator G2.

The circuit for condenser C1 and the winding of relay R1 may be traced from the left-hand or positive terminal of the generator G1 by way of the wire 41, winding a of the relay FR, wire 42, contact c of relay FR, a wire 49, a wire 50, condenser C1, winding of relay R1, wires 51 and 52, and wire 47 to the right-hand or negative terminal of the generator G1.

The circuit for the condenser C2 and winding of relay R2 may be traced from the left-hand or positive terminal of the generator G2 by way of the wire 52, condenser C2, winding of relay R2, wires 43 and 44, contact c of relay RR, wire 45, winding a of relay RR, and wire 46 to the right-hand or negative terminal of the generator G2.

With the contacts of both relays FR and RR in their dropped-out positions, the contacts d of both relays establish a short-circuit connection around the series-connected generators G3 and G4. This circuit may be traced from the left-hand or positive terminal of generator G3, by way of a wire 41a, contact d of relay FR, a wire 42a, a wire 53, contact d of relay RR, a wire 54 to the right-hand or negative terminal of the generator G4, through the armature winding of generator G4 and by a wire 55 to the right-hand or negative terminal of the generator G3.

The short-circuiting of the armature windings of generators G3 and G4 in the manner just described is not objectionable because the resistance of the armature windings is such as to limit the short-circuit current to a safe low value, such as one-tenth of an ampere, which does not cause undue heating of the armature windings.

With the contact d of the relay FR actuated to its picked-up position, the short-circuit connection across the armature windings of generators G3 and G4 just described is interrupted. At the same time, the contact d of relay FR is effective in its picked-up position to establish a circuit connecting the condenser C3 and the winding of the relay R3 in series relation across the terminals of the generator G3. This circuit may be traced from the left-hand or positive terminal of the generator G3, by way of the wire 41a, contact d of relay FR, a wire 56, a branch wire 57, condenser C3, winding of relay R3, a wire 58, a wire 59, and wire 55 to the right-hand or negative terminal of the generator G3.

At the same time, the contact d of relay RR is effective in its dropped-out position to establish a circuit connecting the condenser C4 and the winding of the relay R4 in series relation across the terminals of generator G4. This circuit may be traced from the left-hand or positive terminal of the generator G4 by way of the wires 55 and 59, condenser C4, winding of the relay R4, wire 53, contact d of relay RR, and wire 54 back to the right-hand or negative terminal of the generator G4.

It will now be apparent that when the vehicle exceeds a certain low speed in a forward direction, the relay FR is picked-up and the several associated pairs of condensers and relays thereby connected across the terminals of the corresponding generators.

As the acceleration of the vehicle continues, the various condensers C1, C2, C3 and C4 are increasingly charged in accordance with the increasing terminal voltage of the corresponding generators, the current flowing to charge such condensers energizing the windings of the associated relays R1, R2, R3 and R4. However, such condenser charging current corresponding to the acceleration of the vehicle is in the opposite direction to that required to cause pick-up of the contacts of the relays.

After the vehicle attains a desired high speed and travels thereafter at a substantially constant speed, the condenser charging current reduces substantially to zero although the condensers C1, C2, C3 and C4 remain charged to a potential corresponding to the terminal voltage of the corresponding generators.

Let it now be assumed that the operator desires to effect an application of the brakes to bring the car to a stop. To do so he first shuts off the propulsion power and then shifts the brake valve handle 21a out of its brake release position into its application zone an amount corresponding to a desired degree of application of the brakes. The control pipe 16 is thus charged to a corresponding pressure, for example fifty pounds per square inch, fluid under pressure flowing from the control pipe through each of the branch pipes 16a to the control chamber of the several relay valve devices 24, which in turn operate to supply fluid under pressure from the supply pipe 17 to the associated brake cylinders 15 to a corresponding degree. The brakes associated with the vehicle wheels are thus applied to a degree corresponding to the fluid pressure established in the brake cylinders 15.

If the operator desires to reduce the degree of application of the brakes as the speed of the vehicle diminishes he may do so by returning the brake valve handle back toward its brake release position a desired amount. The pressure in the control pipe is thus correspondingly diminished and the relay valve devices 24 operate in response to the reduction of control pipe pressure to effect a corresponding reduction of the pressure in the brake cylinders, thereby effecting a corresponding reduction in the degree of application of the brakes associated with the vehicle wheels.

As long as none of the wheels of the vehicle begin to slip during an application of the brakes, no variation in the degree of application of the brakes is effected except under the control of the operator through the medium of the brake valve 21.

In order to effect a complete release of the brakes after the car comes to a complete stop and before again starting the car, the operator merely restores the brake valve handle 21a to its brake release position to reduce the pressure in the control pipe 16 to atmospheric pressure. The relay valve devices 24 operate correspondingly in response to the reduction of pressure in the control pipe 16 to exhaust fluid under pressure from the brake cylinders 15 to effect a complete release of the brakes.

If at the time an application of the brakes is initiated or at any time during an application of the brakes, the wheels of one or more of the wheel-and-axle assemblies on the car begin to slip, a further operation occurs which will now be described.

Let it be assumed that the wheels of the right-hand wheel-and-axle assembly of truck 11 begin to slip during an application of the brakes thereby causing the terminal voltage of the generator G2 to reduce at a corresponding rate. The condenser C2 accordingly discharges current reversely in the circuit which current is proportional to the rate of reduction of voltage supplied by the generator G2. This current is sufficient to cause pick-up of the contacts of the relay R2.

The contact a of relay R2 is effective in its picked-up or closed position to establish a short-circuit around the condenser C1 and the winding of the relay R1, which circuit is apparent from the drawings without description. The condenser C1 accordingly discharges current locally through the winding of the relay R1 and the shunt connection including the contact a of relay R2 which current is sufficient to cause pick-up of the contacts of the relay R1.

The contact a of the relay R1 is effective in its picked-up position to establish a short-circuit connection around the winding of the relay R2 and condenser C2 in a manner readily apparent from the drawings without description, thereby causing the condenser C2 to continue to discharge current locally through the winding of the relay R2 and the shunt connection including the contact a of relay R1.

The two relays R1 and R2 are thus interlocked and their contacts maintained in picked-up position due to the current discharged locally through the windings of the relays from the corresponding condenser as long as the condenser discharge current is sufficient to maintain the contacts picked-up. As will be explained presently, the time during which the contacts of the relays R1 and R2 are maintained picked-up due to the current discharged from the corresponding condensers is intended to endure for a sufficient time to permit the slipping wheels to be restored substantially to a speed corresponding to the vehicle speed in response to the reduction of brake cylinder pressure effected in the manner presently to be described.

The contacts b of the relays R1 and R2 are effective severally in their picked-up or closed positions to effect energization of the magnet winding 33 of the magnet valve 26 for wheel truck 11. This circuit may be traced from the positive terminal of a suitable source of energy, such as a storage battery 61, by way of a wire 62 hereinafter referred to as a positive battery wire, a wire 63, in parallel through the contacts b of the two relays R1 and R2 to a wire 64, thence through the magnet winding 33 of the magnet valve 26, and a wire 65 to a wire 66 connected to the negative terminal of the battery 61 and hereinafter referred to as the negative battery wire.

The rectifier 36 connected in shunt relation to the magnet winding 33 of the magnet valve 26 is so arranged that it offers a high resistance to flow of current therethrough upon establishment of the energizing circuit for the magnet winding 33 of magnet valve 26. Thus upon the completion of the energizing circuit for the magnet winding 33 of the magnet valve 26 by the contacts b of the relays R1 and R2 the rectifier 36 shunts a negligible current from the winding of the magnet valve so that the magnet winding is accordingly energized to cause actuation of the double beat valve 31 to its lower seated position.

Upon the energization of the magnet winding 33 of the magnet valve 26, communication through the branch pipe 16a of the control pipe 16 to the control chamber of the corresponding relay valve device 24 is closed and, at the same time, the communication is established for exhausting fluid under pressure from the control chamber of the relay valve device 24 to atmosphere at a rapid rate through the port 35 of the magnet valve 26.

Relay valve device 24 accordingly operates in response to the rapid reduction of the pressure in the control chamber thereof to effect a correspondingly rapid reduction of the pressure in the brake cylinders 15 for wheel truck 11. Thus, although only the wheels of the one wheel-andaxle assembly of truck 11 began to slip, the degree of application of the brakes associated with the wheels of both wheel-and-axle assemblies of the truck are instantly and rapidly reduced, thereby anticipating the possible slipping of the non-slipping wheels.

Upon the instantaneous and rapid reduction of the pressure in the brake cylinders 15, the slipping wheels promptly cease to decelerate and begin to accelerate back toward a speed corresponding to vehicle speed before decelerating to a locked or non-rotative condition and sliding.

The time that the relays R1 and R2 are maintained picked-up in response to the current discharged from the corresponding condensers C1 and C2 is such that the slipping wheels will have been restored fully or at least partly to the vehicle speed before drop-out of the relays occurs.

Thus when the contacts of the relays R1 and R2 are restored to the dropped-out or open position, the slipping wheels are either decelerating again in accordance with the rate of deceleration of the vehicle or accelerating while at a speed closely approaching vehicle speed.

Upon the drop-out of the contacts of the relays R1 and R2 and the consequent restoration of their contacts b to open position interrupting the circuit for energizing the magnet winding 33 of the magnet valve 26, the double beat valve 31 of the magnet valve 26 is restored to its upper seated position cutting off the exhaust communication and reestablishing the supply communication through branch pipe 16a from the control pipe 16 to the control chamber of the relay valve device 24.

The rectifier 36 is provided in well-known manner to provide a local low-resistance discharge circuit around the winding 33 of the magnet valve 26 whereby to discharge current induced in the winding due to the falling away of the magnetic flux in the core surrounding the magnet winding, thereby preventing undue arcing and the consequent burning or pitting of the contacts b of relays R1 and R2. This local discharge circuit established by the rectifier 36 may maintain the winding of the magnet valve 26 energized for a slight interval until the induced current dies away. Although the effect of such delay in the restoration of the magnet valve 26 to its normal condition is to delay slightly the instant at which reapplication of the brakes is initiated, such delay is not necessary to the proper operation of the equipment. Obviously any other expedient, such as the connection of a condenser across the contacts of the relays R1 and R2, would serve the same purpose.

Upon the restoration of the communication between the control chamber of the relay valve device 24 and the control pipe 16 through the branch pipe 16a due to the deenergization of the magnet winding 33 of the magnet valve 26, the pressure in the control pipe 16 tends to reduce slightly due to the fluid supplied to the control chamber of the relay valve device 24. Due to the pressure-maintaining feature of the brake valve 21, however, fluid under pressure is supplied to the control pipe 16 to maintain a pressure therein corresponding to the position of the brake valve handle 21a.

The relay valve device 24 is thus operated to restore the pressure in the brake cylinder 15 to a degree corresponding to the pressure established in the control pipe 16, thereby effecting reapplication of the brakes on the truck having the wheels which slipped.

If the wheels begin to slip again upon reapplication of the brakes, the above operation is repeated so that at no time during the stopping distance are the wheels permitted to decelerate to a locked condition and slide.

Upon analysis it will be apparent that substantially the same operation will occur if the wheels of the left-hand wheel-and-axle unit of the truck 11 begin to slip instead of those of the right-hand wheel-and-axle assembly, the only difference being that the contacts of the relay R1 are picked-up first after which the contacts of the relay R2 are picked-up, instead of the reverse order as previously described.

It will be understood that the degree of brake application on truck 12 is not affected or varied in response to the slipping of the wheels on truck 11. In the event that either one or both of the wheel-and-axle assemblies of truck 12 begin to slip during a brake application, the corresponding relays R3 and R4 are picked-up in response to the current discharged from the corresponding condensers C3 and C4. This operation is similar to that previously described for the relays R1 and R2 and a detailed analysis of the operation is accordingly deemed unnecessary. It is deemed sufficient to point out that the contacts b of the relays R3 and R4 are arranged to effect energization of the magnet winding 33 of the magnet valve 26 for the wheel truck 12 by a circuit similar to that described for the magnet valve 26 of the wheel truck 11 and identified by the same reference numerals as in the case of truck 11. The magnet valve 26 for the wheel truck 12 is thus effective to cause the rapid reduction of pressure in the brake cylinders 15 for the wheels of truck 12 when the wheels of either one or both of the wheel-and-axle assemblies of this truck begin to slip.

When the car comes to a complete stop as a result of the brake application, the contacts of the relays R1, R2, R3 and R4 are always restored to the dropped-out position thereof because no discharge of current from condensers C1 to C4 occurs. Thus the magnet valves 26 are always effective to restore the communication between the control chamber of the relay valve devices 24 and the control pipe 16. Accordingly, as long as the brake valve handle 21a remains in its brake application zone, while the vehicle is stopped, the brakes remain applied to a degree corresponding to the pressure established in the control pipe 16. As previously indicated, the brakes may be released again prior to starting the car or vehicle simply by restoring the brake valve handle to its brake release position.

In the foregoing operation, it was assumed that the vehicle was traveling in a forward direction. Let it now be assumed that the vehicle or car travels in the reverse direction so that the wheels rotate in the opposite direction resulting in the reversal of the polarity at the terminals of the generators G1, G2, G3 and G4. In such case, when the vehicle exceeds the speed of ten miles per hour the contacts of the relay RR are actuated to their picked-up position while the contacts of the relays FR remain in their dropped-out position due to the reversal of current in the circuit previously traced for the winding a of each of these relays.

It will be apparent upon analysis that the contact c of relay FR is effective in its dropped-out position to connect the winding of the relay R2 and the condenser C2 in series relation with the winding a of the relay FR across the terminals of the generator G1 while the contact c of the relay RR is effective in its picked-up position to connect the winding of the relay R1 and condenser C1 in series relation with the winding a of the relay RR across the terminals of the generator G2. The condensers C1 and C2 are accordingly charged by a current flowing in the same direction as previously although the polarity of the generators has reversed. It will accordingly be seen that the relays R1 and R2 will operate exactly in the same manner as previously described in response to the slipping of a wheel-and-axle assembly except that they now respond to slipping of the other wheel-and-axle assembly of the same truck.

In a similar manner, it will be apparent that the winding of the relay R3 and the condenser C3 are connected in series across the terminals of the generator G4 under the control of contact d of the relay RR in its picked-up position while the winding of the relay R4 and condenser C4 are connected in series across the terminals of the generator G3 under the control of the contact d of the relay FR.

The relays R1, R2, R3 and R4 accordingly function to control the magnet winding of the same magnet valve 26 as before, in the same manner as previously described. It will thus be seen that the apparatus functions in the same manner to effect the same results notwithstanding reversal of rotation of the vehicle wheels.

*Description of embodiment shown in Fig. 2*

Referring to Fig. 2, a modification of the previously described brake control equipment is shown. The equipment shown in Fig. 2 is for the most part identical with that disclosed in Fig. 1. In describing the apparatus of Fig. 2, therefore, parts identical with corresponding parts in Fig. 1 will be identified by the same reference numeral and only those parts differing from or not provided in Fig. 1 will be specifically described.

Essentially, the arrangement shown in Fig. 2 differs from that of Fig. 1 in the omission of the directional relays FR and RR and the substitution therefor of a polarized relay PR and a unidirectional relay CR. A resistor R1 is also provided instead of the resistor R of Fig. 1.

The polarized relay PR has two windings a and b respectively, and four transfer contacts designated c, d, e and f respectively. Whenever current flows through the windings of relay PR in one direction the contacts c, d, e and f are actuated to the left-hand position in which they are shown and remain in such position thereafter whether or not the windings remain energized. When the direction of flow of current through the windings of the relay PR reverses, the contacts c, d, e and f are actuated to the right-hand position thereof and remain therein thereafter independently of continued energization of the windings as long as the direction of flow of current through the winding does not reverse.

The relay CR has two windings a and b, two front contacts c and d, and two back contacts e and f. The front contacts c and d are actuated from the dropped-out or open position to the picked-up or closed position in response to the sufficient energization of the winding a in one certain direction indicated by the arrow. If the winding a of the relay CR is insufficiently energized or energized by flow of current in the reverse direction, the contacts c and d remain in their dropped-out or open position.

The back contacts e and f of the relay CR are actuated from the dropped-out or closed position to the picked-up or open position in response to the sufficient energization of the winding a of the relay CR in the proper direction and restored to or remain in their dropped-out or closed position if the winding is insufficiently energized or energized by a current in the reverse direction.

The windings a and b of the relay PR are connected in circuit with the generators G1 and G2. The circuit may be traced from the left-hand terminal of generator G1 by way of a wire 71, winding b of the relay PR, contact c of the relay PR in its left-hand position shown, thence by way of wires 72 and 73, condenser C1, a wire 93 including the back contact e of relay CR, condenser C2, wire 75, contact d of the relay PR in its left-hand position, wire 76, winding a of relay PR, and wire 77 to the right-hand terminal of generator G2, armature winding of generator G2, wire 47 to the right-hand terminal of generator G1 and through the armature winding of generator G1 to the starting point or left-hand terminal of generator G1.

It is here assumed, as previously, that for the forward direction of travel of the car or train the left-hand terminals of the generators G1 to G4 are of positive polarity and the right-hand terminals correspondingly of negative polarity. Conversely, it is assumed that for the reverse travel of the car the left-hand terminals of the generators are of negative polarity whereas the right-hand terminals are of positive polarity.

It is further assumed that when the current supplied from the generators G1 and G2 flows through the windings a and b of the relay PR in the direction just traced the contacts of the relay are actuated to their left-hand position shown. Thus, if the contacts c to f of the relay PR are in their right-hand position at the time the car starts to travel in a forward direction the flow of current is initially in the reverse direction through the condensers C1 and C2. Once the windings of the relay PR are energized, the contacts are snap-actuated to their left-hand positions and the circuit previously traced for energizing the windings thereby established and maintained.

In a similar manner, the condensers C3 and C4 and the windings of relays R3 and R4 are connected to the generators G3 and G4 under the control of the transfer contacts e and f of the relay PR. This circuit may be traced from the left-hand terminal of generator G3 by way of a wire 81, contact e of relay PR in its left-hand position, a wire 82, condenser C3, a wire 94 including back contact f of relay CR, condenser C4, a wire 84, contact f of relay PR in its left-hand position, a wire 85 to the right-hand terminal of generator G4, through the armature winding of generator G4, and by wire 55 to the right-hand terminal of the generator G3.

The relay CR is provided to prevent the improper connection of the condensers and relays to the generators which might occur if the transfer contacts c to f of relay PR failed to operate to the proper position corresponding to the direction of travel of the vehicle.

The winding a of the relay CR is connected across the wires 73 and 75 in series with resistor R1, which serves to limit the current through the winding a to a proper value, and is energized by flow of current in the proper direction to cause pick-up of the contacts thereof only when the direction of flow of current through the winding $a$ is from the wire 73 to the wire 75, as indicated by the arrow. Thus the contacts of the relay CR are not actuated to the picked-up position unless the contacts of the relay PR assume the proper position corresponding to the direction of travel of the car.

In the assumed instance of the car traveling in the forward direction, it will be seen that current will flow from the left-hand terminal of the generator G1 through the lower winding $b$ of relay PR and contact $c$ of relay PR in its left-hand position to the wire 73 in a manner previously traced, thence by way of a branch wire 90 including resistor R1 and the winding $a$ of the relay CR to the wire 75, returning to the right-hand terminal of the generator G2 by way of the contact $d$ of relay PR in its left-hand position and the winding $a$ of the relay PR. If the car travels in a reverse direction so that the polarity of the generators G1 and G2 is reversed and the contacts of the relay PR are shifted in a proper manner to the right-hand position, it will be seen that the winding $a$ of the relay CR will again be energized by flow of current from the wire 73 to the wire 75 in the proper direction to cause pick-up of the contacts of the relay CR.

If upon reversal of direction of travel of the car, the contacts of the polarized relay PR do not shift to the proper position, it will be seen that the current through the winding $a$ of the relay CR will flow from the wire 75 to the wire 73 which is opposite to the proper direction. Consequently the contacts of the relays CR will not be actuated to their picked-up position. The contacts $e$ and $f$ of relay CR thus continue to shunt the windings of relays R1 to R4 and these relays are thus rendered non-operative.

The winding $b$ of the relay CR is a holding winding for maintaining the contacts of the relay picked-up independently of energization of the winding $a$ of the relay. The winding $b$ prevents the drop-out of the contacts of the relay CR at low car speed as will be more fully described hereinafter.

The contact $c$ of relay CR is included in a wire 91 that is connected at one end to a wire 74 between the windings of the relays R1 and R2 and at the other end to the wire 47 joining the right-hand and left-hand terminals of the generators G1 and G2 respectively. In a similar manner, the contact $d$ of the relay CR is included in a wire 92 that is connected at one end to a wire 83 between the windings of the relays R3 and R4 and at the other end to the wire 55 joining the right-hand and left-hand terminals of the generators G3 and G4 respectively.

*Operation of the equipment shown in Fig. 2*

Let it be assumed that the car provided with the equipment shown in Fig. 2 is at a standstill with brake valve handle 21a in its brake release position and that the operator operates the propulsion controller (not shown) to cause the car to start in a forward direction. Whenever the speed of the car exceeds a low speed, such as ten miles per hour, the contacts of the relay PR are actuated to the left-hand position unless they are already in such position, in which case they remain in such position.

When the contacts of the relay PR attain the proper position corresponding to the direction of travel, the circuit is established for energizing the pick-up winding $a$ of the relay CR in the proper direction to cause pick-up of the contacts thereof. Promptly upon the attainment of the proper position of the contacts of the relay PR or, if the contacts of relay PR are already in the proper position whenever the car attains a sufficient speed so that sufficient current may be supplied from the generators, the contacts of the relay CR are actuated to their picked-up position. The pick-up of the contacts $e$ and $f$ removes the shunt connection around the windings of the relays R1 and R2 and of relays R3 and R4 respectively. At the same time, the contact $c$ of relay CR is effective to connect the common terminals of the windings of the relays R1 and R2 to the common right-hand and left-hand terminals of the generators G1 and G2 while the contact $d$ performs the same function for the relays R3 and R4 with respect to the generators G3 and G4.

It will now be seen that the condenser C1 and the winding of relay R1 are connected in series across the terminals of the generator G1 in the same manner as in the arrangement shown in Fig. 1. In a similar manner, condenser C2 and the winding of relay R2 are connected in series across the terminals of the generator G2, condenser C3 and the winding of relay R3 are connected across the terminals of the generator G3, and the condenser C4 and winding of relay R4 are connected across the terminals of the generator G4.

Operation of the equipment in response to slipping of the wheels is identical with that described for the equipment of Fig. 1 and accordingly is not repeated.

If, after the car has been brought to a stop in response to an application of the brakes, the operator starts the car in the reverse direction, the contacts of the relay PR are shifted automatically to their right-hand position. It will be seen upon analysis that the relay PR performs the same function as the directional relays FR and RR of Fig. 1, causing the condenser C1 and winding of relay R1 to be now connected across the terminals of the generator G2 and condenser C2 and winding of relay R2 to be connected across the terminals of generator G1 after the contacts of the relay CR are picked-up. In a similar manner, the condenser C3 and winding of relay R3 are now connected across the terminals of the generator G4 while the condenser C4 and winding of relay R4 are connected across the terminals of the generator G3.

It will thus be seen that, notwithstanding a reversal in the direction of travel of the car, the polarity of the voltage impressed on the condensers C1 to C4 and the windings of relays R1 to R4 from the generators remain uniform.

When any of the relays R1 to R4 are picked up in response to the slipping of the corresponding wheel-and-axe unit, it establishes a circuit for energizing the magnet winding of the corresponding magnet valve 26, just as in Fig. 1. In the arrangement shown in Fig. 2, however, the circuit for energizing the magnet winding 33 of the magnet valves 26 includes the winding $b$ of the relay CR. Thus, notwithstanding the fact that the speed of the car may reduce to a low value, the contacts of the relay CR remain in their picked-up position, once they are picked-up, until such time as the circuit for energizing the magnet winding of either of the magnet valves 26 is interrupted by the drop-out of the contacts $b$ of the relays R1 to R4. Thus, the interruption of the circuit for energizing the magnet windings of the magnet valves 26 due to the drop-out of the contacts of the relays CR, which might otherwise occur at low vehicle speed, is prevented. It will be apparent that if the contacts of the relay CR were dropped-out before all of the contacts b of the relays C1 to C4 are restored to their dropped-out position, the duration of the time that the reduction of the pressure in the brake cylinders 15 occurs would be shortened undesirably and reapplication of the brakes correspondingly initiated prematurely. The provision of the holding winding b for the relay CR thus insures a reduction of the pressure in the brake cylinders under the control of the magnet valves 26 at all times until the relays R1 to R4 are dropped-out.

If the speed of the car or train is so low that the current supplied to energize the winding a of the relay CR is insufficient to pick-up the contacts thereof, obviously the windings of the relays R1 to R4 will remain shunted by the contacts e and f of relay CR and no operation of relays R1 to R4 will occur. However, this is unobjectionable because even if slipping of the wheels did occur at such time the time remaining until the car comes to a complete stop is so short as to preclude the possibility of any damage to the car wheels due to sliding.

Similarly, if the contacts of the polarized relay PR are in the wrong position for the direction of travel of the vehicle, relay CR remains dropped out. Thus the relays R1 to R4 are non-operative. However, no improper operation of the equipment can occur.

Summary

Summarizing, it will be seen that I have disclosed several embodiments of a brake control equipment for vehicles such as railway cars and trains for guarding against sliding of the wheels. In both embodiments, a rapid reduction of brake cylinder pressure is initiated at the instant a wheel begins to slip and the reduction is automatically continued for a sufficient length of time to insure the restoration of the slipping wheel either entirely or partly to a speed corresponding to vehicle speed after which reapplication of the brakes is automatically effected. In both embodiments the means for insuring the continued reduction in brake cylinder pressure in response to the initiation of wheel slip is effected by causing a relay initially picked-up in response to slipping of a wheel to be maintained picked-up for a certain time by current discharged through the winding of the relay from a normally charged condenser.

It will be apparent that I have also disclosed a vehicle brake control equipment of the type including relays adapted to be picked-up in response to the slipping of the vehicle wheels which requires the reversal of connections thereto in accordance with the reversal of direction of travel of the vehicle. This equipment includes a polarized relay having contacts actuated to one or the other of two positions in accordance with the polarity of direct-current axle-driven generators. In order to prevent the incorrect connection caused by failure of the polarized relay to properly position itself in accordance with the polarity of the axle-driven generators, an additional relay is provided for preventing response of the relays responsive to slipping of the wheels unless the polarized relay is properly positioned in accordance with the direction of travel of the vehicle.

Having now described my invention, what I claim as new and desire to secure by Letters Patent, is:

1. In a vehicle brake control equipment of the type having means under the control of the operator for effecting application and release of the brakes associated with the wheels of the vehicle, the combination of control means operative to effect a reduction in the degree of application of the brakes associated with a wheel of the vehicle, means operative in response to the slipping of the said wheel for causing operation of said control means, an electrical condenser separate from said wheel slip responsive means, means controlled by the said wheel slip responsive means and effective upon slipping of said wheel to cause a variation in the electrical charge carried on said condenser, and means responsive to the variation of the electrical charge on said condenser for causing said control means to continue to effect reduction in the degree of application of the brakes for at least a certain length of time.

2. In a vehicle brake control equipment of the type having means under the control of the operator for effecting application and release of the brakes associated with the wheels of the vehicle, the combination of control means operative to effect a reduction in the degree of application of the brakes associated with a wheel of the vehicle, means operative in response to the slipping of said wheel for causing operation of said control means, a normally charged condenser separate from said wheel slip responsive means, means controlled by the said wheel slip responsive means and effective upon slipping of said wheel to cause a reduction of the electrical charge carried on said condenser, and means responsive to the reduction of the electrical charge on said condenser for causing said control means to continue to effect reduction in the degree of application of the brakes for at least a certain length of time.

3. In a vehicle brake control equipment of the type having means under the control of the operator for effecting application and release of the brakes associated with the wheels of the vehicle, the combination of control means operative to effect a reduction in the degree of application of the brakes associated with a wheel of the vehicle, means responsive to the slipping of the said wheel for causing operation of said control means, a normally charged condenser separate from said wheel slip responsive means, electroresponsive means, means controlled by said wheel slip responsive means and effective when the wheel slips for causing said condenser to discharge current to energize said electroresponsive means for a certain length of time, said electroresponsive means being effective while energized to cause said control means to remain in its operative position continuing a reduction in the degree of application of the brakes.

4. In a vehicle brake control equipment of the type having means under the control of the operator for effecting application and release of the brakes associated with the wheels of the vehicle, the combination of control means operative to effect a reduction in the degree of application of the brakes associated with a wheel of the vehicle, means responsive to the slipping of the said wheel for causing operation of said control means, a condenser separate from said wheel slip responsive means, means for causing said condenser to be normally charged, means controlled by the wheel slip responsive means and effective upon initiation of slipping of said wheel for causing current to be discharged from said condenser, and means responsive to the discharge of current from said condenser for causing said control means to be maintained in its operated position for a certain length of time.

5. In a vehicle brake control equipment of the type having a brake cylinder to which fluid under pressure is supplied to effect application of the brakes associated with a wheel of the vehicle and from which fluid under pressure is released to effect release of the brakes, the combination of valve means normally in a position to effect the supply of fluid under pressure to the brake cylinder and operative to a different position to effect the release of fluid under pressure from the brake cylinder, means operatively responsive only to the rotative deceleration of said wheel at a rate exceeding a certain rate for causing operation of said valve means to its different position, a condenser separate from the last said means, means for charging said condenser, means controlled by said deceleration responsive means and effective upon the initial rotative deceleration of said wheel at a rate exceeding said certain rate for causing said condenser to be discharged, and means responsive to the discharge of said condenser for causing said valve means to be maintained in its said different position for a certain length of time following the instant it is first operated thereto.

6. In a vehicle brake control equipment of the type having means under the control of the operator for effecting application and release of the brakes associated with the wheels of the vehicle, the combination of control means operative to effect a reduction in the degree of application of the brakes associated with a wheel of the vehicle, means for supplying a direct-current voltage substantially proportional to the rotational speed of the wheel, a relay having a winding, a condenser, the winding of said relay and said condenser being connected in series circuit relation with said voltage supply means whereby said condenser is charged with current flowing in one direction through the winding of the relay and whereby current is discharged from the condenser through the winding of the relay in the opposite direction in response to increases and decreases respectively in the voltage of said voltage supply means, the winding of said relay being effective to cause pick-up of the relay only when energized by a current discharged from said condenser and exceeding a certain value as a result of a reduction in the voltage supplied by the voltage supply means, and means effective upon the pick-up of said relay for causing said condenser to discharge current through the winding of the relay independently of the reduction in the voltage of the voltage supply means, said relay being effective as long as it is picked-up for causing operation of the control means.

7. In a vehicle brake control equipment of the type having means under the control of the operator for effecting application and release of the brakes associated with the wheels of the vehicle, the combination of control means operative to effect a reduction in the degree of application of the brakes associated with a vehicle wheel, a relay having a winding effective when energized by current exceeding a certain value for causing pick-up of the relay, said relay being effective while picked-up to cause operation of said control means, means for energizing the winding of said relay by current substantially proportional to the rate of rotative deceleration of the vehicle wheel a normally charged condenser, and means responsive to the pick-up of said relay for causing said condenser to discharge current through the winding of said relay to maintain the relay picked-up for a certain length of time.

8. In a vehicle brake control equipment of the type having means under the control of the operator for effecting application and release of the brakes associated with the wheels of the vehicle, the combination of control means operative to effect a reduction in the degree of application of the brakes associated with a wheel of the vehicle, means supplying a direct-current voltage substantially proportional to the rotational speed of said wheel, a circuit associated with said voltage supply means, means for causing a current to flow in said circuit substantially proportional to the rate of change of voltage delivered by the voltage supply means, a relay having a winding effective to cause pick-up of the relay only in response to a current in said circuit exceeding a certain value and corresponding to rotative deceleration of the vehicle wheel at a rate exceeding a certain rate, an electrical condenser in said circuit adapted to be normally charged in accordance with the voltage delivered by the voltage supply means, and means effective in response to the pick-up of said relay for causing said condenser to discharge current through the winding of said relay to maintain said relay picked-up for a certain length of time, said relay being effective while picked-up to cause said control means to continue to effect reduction in the degree of application of the brakes.

9. In a vehicle brake control equipment of the type having means under the control of the operator for effecting application and release of the brakes associated with the wheels of the vehicle, the combination of control means operative to effect a reduction in the degree of application of the brakes associated with two separately rotatable wheels of the vehicle, a first means for supplying a direct-current voltage substantially proportional to the rotational speed of one of said wheels, a second means for supplying a direct-current voltage substantially proportional to the rotational speed of the other of said wheels, a first circuit associated with said first voltage supply means, means for causing a current to flow in said first circuit substantially proportional to the rate of change of voltage delivered by said first voltage supply means, a second circuit associated with the second voltage supply means, means for causing a current to flow in said circuit substantially proportional to the rate of change of voltage delivered by the said second voltage supply means, a first relay having a winding effective when energized by a current in said first circuit exceeding a certain value for causing pick-up of the relay, a second relay having a winding effective when energized by a current exceeding a certain value in said second circuit for causing pick-up of the said second relay, a first normally charged condenser associated with said first relay, a second normally charged condenser associated with said second relay, said first relay being effective when picked-up to cause operation of said control means and discharge of current from said second condenser through the winding of said second relay to cause pick-up thereof, said second relay being effective when picked-up to maintain said control means in its operated position and to cause discharge of current from said first condenser through the winding of said first relay, said first and said second relays being severally effective as long as they are maintained picked-up by current discharged through the windings thereof from the corresponding condensers to maintain said control means in an operated condition, thereby to continue the reduction in the degree of application of the brakes associated with said wheels for a certain length of time.

10. In a vehicle brake control equipment of the type having a brake cylinder to which fluid under pressure is supplied to effect application of the brakes and from which fluid under pressure is released to effect release of the brakes associated with a plurality of wheels of the vehicle, the combination of a valve device having a magnet winding effective when deenergized to condition the valve device to permit the supply of fluid under pressure to the brake cylinder and when energized to cause a release of fluid under pressure from the brake cylinder, a pair of relays each of which has a winding and contacts severally effective in response to the pick-up of the corresponding relays for causing energization of the magnet winding of said valve device, means for causing pick-up of one of said relays in response to the slipping of one of the vehicle wheels, means for causing pick-up of the other of said relays in response to the slipping of another of said vehicle wheels, a pair of normally charged electrical condensers, means effective in response to pick-up of one of said relays to cause one of said condensers to discharge current through the winding of the other of said relays to maintain it picked-up for a certain length of time, said other relay being effective when picked-up to cause the other of said condensers to discharge current through the winding of said one relay thereby to maintain it picked-up for a certain length of time, said relays being effective when dropped-out to effect the deenergization of the magnet winding of said magnet valve device.

11. In a vehicle brake control equipment of the type having a brake cylinder to which fluid under pressure is supplied to effect application of the brakes and from which fluid under pressure is released to effect release of the brakes associated with a plurality of wheels of the vehicle, the combination of a valve device having a magnet winding effective when deenergized to condition the valve device to permit the supply of fluid under pressure to the brake cylinder and when energized to cause a release of fluid under pressure from the brake cylinder, a pair of relays each of which has a winding and contacts severally effective in response to the pick-up of the corresponding relays for causing energization of the magnet winding of said valve device, means for causing pick-up of one of said relays in response to the slipping of one of the vehicle wheels, means for causing pick-up of the other of said relays in response to the slipping of another of said vehicle wheels, a pair of normally charged electrical condensers, means responsive to the pick-up of said one relay for causing one of said condensers to discharge current through the winding thereof to maintain it picked-up for a certain length of time, and means responsive to the pick-up of the other of said relays for causing the other of said condensers to discharge current through the winding of said other relay to maintain it picked-up for a certain length of time.

12. In a vehicle brake control equipment of the type having means under the control of the operator for effecting application and release of the brakes associated with the wheels of the vehicle, the combination of a magnet valve device effective upon energization to cause a reduction in the degree of application of the brakes associated with a wheel of the vehicle, a relay having a winding effective when energized by a current exceeding a certain value in one direction only for effecting pick-up of the relay, said relay being effective when picked-up to cause energization of the magnet valve device, a condenser, a first generator for supplying a direct-current voltage substantially proportional to the rotational speed of one of said wheels and of opposite polarity for opposite directions of rotation thereof, a second generator for supplying a direct-current voltage substantially proportional to the rotational speed of another of said wheels and of opposite polarity for opposite directions of rotation of the wheel, and means responsive to a reversal of polarity of the voltages supplied by said generators for causing the winding of said relay and said condenser to be connected in serial relation selectively to one or the other of said generators in a manner to cause a uniform polarity of voltage to be impressed thereon, whereby notwithstanding a reversal in the direction of rotation of the wheels said condenser is always charged by flow of current thereto in a given direction in response to an increase of the voltage supplied by said generators and whereby current is discharged from said condenser through the winding of said relay in the said one direction required to cause pick-up thereof in response to a reduction in the voltage of the generators, said condenser being effective to discharge a current in excess of the value required to pick-up said relay only in response to a reduction of the voltage supplied by either of said generators at a rate exceeding a certain rate and corresponding to a certain rate of rotative deceleration of the corresponding wheels.

13. In a vehicle brake control equipment of the type having means under the control of the operator for effecting application and release of the brakes associated with the wheels of the vehicle, the combination of a first generator for supplying a direct-current voltage substantially proportional to the rotational speed of one wheel of the vehicle and of opposite polarity for opposite directions of rotation of the wheel, a second generator for supplying a direct-current voltage substantially proportional to the rotational speed of another wheel of the vehicle and of opposite polarity for opposite directions of rotation of the wheel, a control relay having a winding, a condenser, a first directional relay having a winding, a second directional relay having a winding, the windings of said directional relays being connected in series relation in a circuit including the summation of the voltages supplied by said first and said second generator, said first directional relay being operated from a dropped-out to a picked-up position only when the winding thereof is energized by a current exceeding a certain value for one polarity of said generators, said second directional relay being operated from its dropped-out to its picked-up position only when the winding thereof is energized by a current exceeding a certain value for the opposite polarity of said generators, said first directional relay having a contact effective in the picked-up position of the relay to cause the voltage of one polarity delivered by the first said generator to be impressed across said condenser and the winding of said control relay, said second directional relay having a contact effective in the picked-up position of the relay to cause the voltage of said second generator of like polarity to said one polarity to be impressed on said condenser and the winding of said relay, said control relay being picked-up when the winding thereof is energized by a current discharged from said condenser exceeding a certain value and corresponding to a certain rate of reduction in the voltage supplied by either of said generators, and means effective as long as said relay is picked-up for effecting a reduction in the degree of application of the brakes associated with said wheels.

14. In a vehicle brake control equipment of the type having means under the control of the operator for effecting application and release of the brakes associated with the wheels of the vehicle, the combination of a first generator for supplying a voltage substantially proportional to the rotational speed of one wheel of the vehicle and of opposite polarity for opposite directions of rotation thereof, a second generator for supplying a direct-current voltage substantially proportional to the rotational speed of a different vehicle wheel and of opposite polarity for opposite directions of rotation of the wheel, a control relay having a winding, a condenser, a polarized relay having a winding energized by flow of current in one direction for one polarity of said generators and by flow of current in the opposite direction for the opposite polarity of said generators, said polarized relay having contacts actuated to one position in response to flow of current through the winding thereof in the said one direction and actuated to a different position in response to the flow of current through the winding in the opposite direction, said contacts being effective in the said one position thereof to connect the winding of the said control relay and the condenser so as to be subject in series relation to the voltage of said first generator and effective in the said different position thereof to connect said winding of said control relay and the condenser in series relation in a manner to be subject to the voltage delivered by said second generator, the voltage impressed on the winding of the control relay and the condenser being of the same polarity in each case notwithstanding the reversal of polarity of the generators due to reversal in the direction of rotation of the wheels, the winding of said control relay being effective when energized by a current exceeding a certain value and discharged from said condenser in response to a reduction in the voltage of either of said generators at a rate exceeding a certain rate and corresponding to a certain rate of deceleration of the vehicle wheels for causing pick-up of the control relay, means controlled by said polarized relay and effective to prevent an operative response of said control relay unless the contacts of the polarized relay are in the proper position corresponding to the polarity of the generators, and means effective while said relay is picked-up for causing a continued reduction in the degree of application of the brakes associated with said wheels.

15. In a vehicle brake control equipment of the type having means under the control of the operator for effecting application and release of the brakes associated with the wheels of the vehicle, the combination of a first generator for supplying a voltage substantially proportional to the rotational speed of one wheel of the vehicle and of opposite polarity for opposite directions of rotation thereof, a second generator for supplying a direct-current voltage substantially proportional to the rotational speed of a different vehicle wheel and of opposite polarity for opposite directions of rotation of the wheel, a control relay having a winding, a condenser, a polarized relay having a winding energized by flow of current in one direction for one polarity of said generators and by flow of current in the opposite direction for the opposite polarity of said generators, said polarized relay having contacts actuated to one position in response to flow of current through the winding thereof in the said one direction and actuated to a different position in response to the flow of current through the winding in the opposite direction, said contacts being effective in the said one position thereof to connect the winding of the said control relay and the condenser so as to be subject in series relation to the voltage of said first generator and effective in the said different position thereof to connect said winding of said control relay and the condenser in series relation in a manner to be subject to the voltage delivered by said second generator, the voltage impressed on the winding of the control relay and the condenser being of the same polarity in each case notwithstanding the reversal of polarity of the generators due to reversal in the direction of rotation of the wheels, the winding of said control relay being effective when energized by a current exceeding a certain value and discharged from said condenser in response to a reduction in the voltage of either of said generators at a rate exceeding a certain rate and corresponding to a certain rate of deceleration of the vehicle wheels for causing pick-up of the control relay, a second relay having a winding effective when energized by current exceeding a certain value and flowing only in one certain direction therethrough for causing pick-up of the relay, said second relay being effective when picked-up to render the said control relay responsive to current discharged from said condenser and to prevent an operative response of said control relay when said second relay is not picked-up, and means controlled by said control relay and effective as long as said control relay is picked-up for causing a continued reduction in the degree of application of the brakes associated with the said wheels.

16. In a vehicle brake control equipment of the type having means under the control of the operator for effecting application and release of the brakes associated with the wheels of the vehicle, the combination of a first generator for supplying a voltage substantially proportional to the rotational speed of one wheel of the vehicle and of opposite polarity for opposite directions of rotation thereof, a second generator for supplying a direct-current voltage substantially proportional to the rotational speed of a different vehicle wheel and of opposite polarity for opposite directions of rotation of the wheel, a control relay having a winding, a condenser, a polarized relay having a winding energized by flow of current in one direction for one polarity of said generators and by flow of current in the opposite direction for the opposite polarity of said generators, said polarized relay having contacts actuated to one position in response to flow of current through the winding thereof in the said one direction and actuated to a different position in response to the flow of current through the winding in the opposite direction, said contacts being effective in the said one position thereof to connect the winding of the said control relay and the condenser so as to be subject in series relation to the voltage of said first generator and effective in the said different position thereof to connect said winding of said control relay and the condenser in series relation in a manner to be subject to the voltage delivered by said second generator, the voltage impressed on the winding of the control relay and the condenser being of the same polarity in each case notwithstanding the reversal of polarity of the generators due to reversal in the direction of rotation of the wheels, the winding of said control relay being effective when energized by a current exceeding a certain value and discharged from said condenser in response to a reduction in the voltage of either of said generators at a rate exceeding a certain rate and corresponding to a certain rate of deceleration of the vehicle wheels for causing pick-up of the control relay, a second relay having a winding effective when energized by current exceeding a certain value and flowing only in one certain direction therethrough for causing pick-up of the relay, said second relay being effective when picked-up to render the said control relay responsive to current discharged from said condenser and to prevent an operative response of said control relay when said second relay is not picked-up, means controlled by said control relay and effective as long as said control relay is picked-up for causing a continued reduction in the degree of application of the brakes associated with the said wheels, and means effective as long as the said control relay is picked-up for maintaining the said second relay picked-up.

17. In a vehicle brake control equipment of the type having means under the control of the operator for effecting application and release of the brakes associated with the wheels of the vehicle, the combination of a first generator for supplying a voltage substantially proportional to the rotational speed of one wheel of the vehicle and of opposite polarity for opposite directions of rotation thereof, a second generator for supplying a direct-current voltage substantially proportional to the rotational speed of a different vehicle wheel and of opposite polarity for opposite directions of rotation of the wheel, a control relay having a winding, a condenser, a polarized relay having a winding energized by flow of current in one direction for one polarity of said generators and by flow of current in the opposite direction for the opposite polarity of said generators, said polarized relay having contacts actuated to one position in response to flow of current through the winding thereof in the said one direction and actuated to a different position in response to the flow of current through the winding in the opposite direction, said contacts being effective in the said one position thereof to connect the winding of the said control relay and the condenser so as to be subject in series relation to the voltage of said first generator and effective in the said different position thereof to connect said winding of said control relay and the condenser in series relation in a manner to be subject to the voltage delivered by said second generator, the voltage impressed on the winding of the control relay and the condenser being of the same polarity in each case notwithstanding the reversal of polarity of the generators due to reversal in the direction of rotation of the wheels, the winding of said control relay being effective when energized by a current exceeding a certain value and discharged from said condenser in response to a reduction in the voltage of either of said generators at a rate exceeding a certain rate and corresponding to a certain rate of deceleration of the vehicle wheels for causing pick-up of the control relay, a second relay having two separate windings, one of said windings being effective when energized by a current in only one certain direction for causing pick-up of the relay and adapted to be energized by a current in said one direction only if the contacts of said polarized relay are in the proper position corresponding to the polarity of said generators, the other of said windings being energized in response to the pick-up of said control relay to maintain said second relay picked up independently of the current in the said one winding, said second relay being effective when picked-up to render said control relay responsive to current discharged from said condenser and effective when dropped-out to prevent an operative response of said control relay, and means controlled by said control relay and effective as long as said control relay is picked-up for causing a continued reduction in the degree of application of the brakes associated with said wheels.

18. In a vehicle brake control equipment, the combination of control means operative to effect a reduction in the degree of application of the brakes associated with a vehicle wheel, a relay effective when picked-up to cause operation of said control means, means for causing pick-up of said relay only when the said vehicle wheel rotatively decelerates at a slipping rate, a normally charged condenser so connected and arranged as to be discharged in response to pick-up of said relay, and current-responsive means energized by current discharged from said condenser for causing operation of the control means for a limited time corresponding to the length of time during which at least a certain uniform current is discharged from said condenser.

19. In a vehicle brake control system, the combination of control means operative to effect a reduction in the degree of application of the brakes associated with a wheel of the vehicle, means operatively responsive to slipping of said wheel for causing operation of said control means, means responsive to the direction of rotation of the wheel for rendering said wheel slip responsive means operative notwithstanding rotation of the wheel in opposite directions at different times, and means for preventing an operative response of the said wheel slip responsive means to slipping of said wheel if the said direction responsive means has not responded correctly in accordance with the direction of rotation of the vehicle wheel.

20. In a vehicle wheel brake control equipment, the combination of means for supplying direct-current voltage substantially proportional to the rotational speed of the wheels and of opposite polarity for opposite directions of rotation thereof, a circuit associated with said voltage supply means, means for causing a current to flow in said circuit substantially proportional to the rate of change of voltage supplied by the voltage supply means, means including a polarized relay controlled according to the polarity of the voltage supplied by the voltage supply means and having contacts for causing the current to flow in said circuit in one certain direction whenever the voltage supplied by the voltage supply means reduces in response to the deceleration of the wheels and in the opposite direction whenever the voltage supplied by the voltage supply means increases in response to acceleration of the wheels, a relay having a winding operating on said circuit and operatively responsive only when the winding is energized by a current in said one direction exceeding a certain value, means controlled by said relay and effective, while said relay is operated, for causing reduction in the degree of application of the brakes associated with the wheels, and means controlled by said polarized relay for rendering said relay non-operative if the polarized relay is not properly conditioned in accordance with the polarity of the voltage supplied by the voltage supply means.

21. In a vehicle wheel brake control system, the combination of means for supplying a direct-current voltage substantially proportional to the rotational speed of the wheels and of opposite polarity for opposite directions of rotation thereof, a relay having a winding, an electrical condenser, means including a polarized relay controlled according to the polarity of the voltage supplied by the voltage supply means for associating said relay and said condenser in series relation in a manner to cause the imposition by the voltage supply means of a voltage of uniform polarity notwithstanding a reversal of polarity of the voltage supplied by the voltage supply means, said condenser being charged according to the voltage supplied by the voltage supply means and effective to discharge a current through the winding of said relay substantially proportional to the rate of reduction of the voltage supplied by the voltage supply means, said relay being operatively responsive only when the current energizing its winding and discharged from the condenser exceeds a certain value, means controlled by said relay and effective in response to operation of said relay to effect a reduction in the degree of application of the brakes associated with the wheels, and means controlled by said polarized relay and effective to shunt the winding of said relay to thereby prevent an operative response thereof unless said polarized relay is properly conditioned in accordance with the polarity of the voltage supplied by the voltage supply means.

ANDREW J. SORENSEN.